United States Patent [19]

Beale

[11] Patent Number: 5,313,399
[45] Date of Patent: May 17, 1994

[54] ADAPTIVE SYNCHRONOUS VIBRATION SUPPRESSION APPARATUS

[75] Inventor: Stuart R. Beale, Boston, Mass.

[73] Assignee: The Charles Stark Draper Laboratories, Inc., Cambridge, Mass.

[21] Appl. No.: 822,701

[22] Filed: Jan. 21, 1992

[51] Int. Cl.$^5$ .................. G05B 19/02; H02K 7/09
[52] U.S. Cl. ........................ 364/463; 310/90.5; 73/461; 364/508; 364/148
[58] Field of Search .......... 364/463, 508, 724.19, 364/726, 574, 576, 581, 148; 73/461, 593, 579, 662, 672, 468, 472, 480, 481, 486, 462; 310/90.5, 51; 318/629

[56] References Cited

U.S. PATENT DOCUMENTS

| | | | |
|---|---|---|---|
| 4,626,754 | 12/1986 | Habermann et al. | 318/460 |
| 4,910,449 | 3/1990 | Hiyama et al. | 318/640 |
| 4,912,387 | 3/1990 | Moulds, III | 318/629 |
| 4,941,352 | 7/1990 | Fietzke | 73/461 |
| 4,947,356 | 8/1990 | Elliott et al. | 364/574 |
| 5,084,643 | 1/1992 | Chen | 310/90.5 |
| 5,202,824 | 4/1993 | Chen | 364/508 |

Primary Examiner—Thomas G. Black
Assistant Examiner—Michael Zanelli
Attorney, Agent, or Firm—Joseph S. Iandiorio

[57] ABSTRACT

An adaptive synchronous vibration suppression apparatus for suppressing vibrations in a dynamic system subject to synchronous disturbance detects the energy representative of the synchronous component of the vibration induced by the synchronous disturbance; generates the Fourier coefficients, amplitude and phase components command; and applies the command to operate an actuator to apply a force to the system to suppress the detected vibration.

16 Claims, 7 Drawing Sheets

ADAPTIVE SYNCHRONOUS VIBRATION SUPPRESSION APPARATUS

FIELD OF INVENTION

This invention relates to an adaptive synchronous vibration suppression apparatus for suppressing vibration in a dynamic system subject to synchronous disturbances. In one application this invention relates to an adaptive forced balancing system for a rotor magnetic bearing suspension apparatus, and more particularly to such a system which uses the synchronous energy representative of the mass-unbalance to define the orbit of the geometric center to effectively rotate the rotor about its center of mass.

BACKGROUND OF INVENTION

Mass-unbalance in rotating machines acts as an undesirable synchronous disturbance at all operating frequencies. With the use of magnetic bearings as active control elements it is possible to adaptively compensate for mass-unbalance loading, thus eliminating vibration and fatigue in the support structure of the rotor.

There are two former methods of performing mass unbalance compensation. In conventional autobalancing a notch filter centered at the frequency of rotation is inserted in the control loop. Because of the notch filter, the control law has no gain at the frequency of rotation; hence, the bearings become "soft" at this frequency. No bearing force is generated, and the rotor pivots about its center of mass as if it were in free space. The second former method is a model-based balancing approach. Here an estimate of the mass-unbalance eccentricity is obtained by subtracting the output of a plant model or observer from the measured rotor position.

In conventional autobalancing the notch frequency may be within or near the bandwidth of the control system (if the control system has a very low bandwidth balancing would be unnecessary). The disadvantage is that the stability margins of the system are severely degraded due to the phase lag contributed by the notch filter. Disturbance rejection properties near the notch frequency are also degraded. Furthermore, when the rotor spins through its critical speeds (i.e., bending modes) the notch filter must be disabled to avoid instability. This form of autobalancing is inappropriate for moving platform applications (e.g., jet engines) because such applications require high-bandwidth controllers and guaranteed stability margins.

Model-based balancing requires the implementation of an observer and may be sensitive to modeling errors and time-varying plant parameters. The disadvantage is that the balancing achieved can be only as good as the accuracy of the model used. Also, model-based balancing tends to restrict system bandwidth.

Magnetic bearing suspension systems are but one environment in which unwanted dynamic vibrations occur. They can occur in any type of rotary system with any type of suspension apparatus. Moreover, dynamic vibrations, rotary or not, can occur in any kind of mechanical or acoustic environment. For example: environmental vibrations in a duct caused by a fan; unwanted vibrations in a vehicle seat caused by the vehicle engine.

SUMMARY OF INVENTION

It is therefore an object of this invention to provide an improved adaptive synchronous vibration suppression apparatus for suppressing vibrations in a dynamic system subject to a synchronous disturbance.

It is a further object of this invention to provide such an improved adaptive synchronous vibration suppression apparatus for suppressing vibrations in a dynamic system subject to a synchronous disturbance which adapts easily to changes in amplitude and phase of the vibrations.

It is a further object of this invention to provide such an improved adaptive synchronous vibration suppression apparatus for suppressing vibrations in a dynamic system subject to a synchronous disturbance which suppresses vibrations by eliminating the source of the disturbance or cancelling the vibrational effects of the disturbance.

It is a further object of this invention to provide such an improved adaptive synchronous vibration suppression apparatus for suppressing vibrations in a dynamic system subject to a synchronous disturbance which facilitates an adaptive forced balancing system for a rotor suspension apparatus.

It is a further object of this invention to provide such an improved adaptive forced balancing system for a rotor suspension apparatus using a magnetic bearing suspension apparatus.

It is a further object of this invention to provide such an improved adaptive forced balancing system for a magnetic bearing suspension apparatus.

It is a further object of this invention to provide such an adaptive forced balancing system which eliminates vibration due to mass-unbalance.

It is a further object of this invention to provide such an adaptive forced balancing system which compels the rotor geometric center to assume an orbit so that the rotor rotates about its center of mass rather than its geometric center.

It is a further object of this invention to provide such an adaptive forced balancing system which does not degrade the stability of the magnetic suspension.

It is a further object of this invention to provide such an adaptive forced balancing system which achieves balancing despite modeling errors, external disturbances, or sudden changes in system balances.

It is a further object of this invention to provide such an adaptive forced balancing system in which control energy is minimized by eliminating energy required to control unbalanced rotor position.

It is a further object of this invention to provide such an adaptive forced balancing system which is applicable independent of the use of the magnetic bearing suspension apparatus or the magnitude of the unbalance.

The invention results from the realization that a truly effective adaptive synchronous vibration suppression apparatus for suppressing vibrations in a dynamic system subject to synchronous disturbance can be achieved by detecting the synchronous energy representative of the vibrations induced by a synchronous disturbance, generating a command from the Fourier coefficient amplitude and phase quadrature components and using that command to apply a force to the system to suppress the detected vibrations, and that in keeping with this approach a more stable and effective forced balancing mechanism which eliminates vibration in rotating machines due to mass-unbalance can be achieved by detecting the synchronous energy representative of the mass-unbalance of the rotor and using that to define the orbit of the geometric center of the rotor to effect rotation of the rotor about its center of mass. The invention can be applied to eliminate the source of the disturbances or to cancel the vibrational effects of it.

This invention features an adaptive synchronous vibration suppression apparatus for suppressing vibrations in a dynamic system subject to synchronous disturbances. There are means for detecting the energy representative of the synchronous component of the vibration induced by the synchronous disturbance. There are also means responsive to the means for detecting for generating the Fourier coefficients, amplitude and phase command. Actuator means respond to the command to apply a force to the system to suppress the detected vibration.

In a preferred embodiment the means for detecting may include means for extracting the synchronous component of the vibration and there may be means responsive to the synchronous component for producing the absolute value of the synchronous component. There may also be means responsive to the absolute value of the synchronous component for defining the average of the absolute value of the synchronous component. The means for generating may include means for computing from the energy representative of the synchronous component of vibration the Fourier coefficients of the command, as well as means responsive to the Fourier coefficients for calculating the quadrature components of the command and means responsive to the means for calculating for summing the quadrature components to obtain the command. The means for computing may include a channel for developing each of the Fourier coefficients and switching means for selectively enabling one of the channels and disabling the other as a function of the value of the energy representative of the synchronous component of the vibration. The means for switching may include means for disabling the enabled channel and enabling the disabled channel when the energy value is increasing, concave upward, and a local extremum has been reached.

The invention also features the synchronous vibration suppression apparatus embodied in an adaptive forced balancing system for a rotor suspension apparatus having a suspension control signal, and means responsive to the control signal for detecting the energy representative of the mass-unbalance of the rotor. There are means responsive to the means for detecting for generating a position command to the rotor suspension apparatus to define the orbit of the geometric center of the rotor to effect rotation of the rotor about its center of mass. The rotor suspension apparatus may include a magnetic bearing suspension apparatus and the control signal may be a magnetic bearing control signal.

In a preferred embodiment the means for detecting may include means for extracting the synchronous component of the control signal, means responsive to the synchronous component for producing the absolute value of the synchronous component, and means responsive to the absolute value of the synchronous component for defining the average of the absolute value of the synchronous component. The means for generating may include means for computing from the energy representative of the mass-unbalance of the rotor the Fourier coefficients for the position command, means responsive to the Fourier coefficients for calculating the quadrature components for the position command, and means responsive to the means for calculating for summing the quadrature components to obtain the position command. The means for computing may include a channel for developing each of the Fourier coefficients and may contain switching means for selectively enabling one of the channels and disabling the other as a function of the value of the energy representative of the mass-unbalance of the rotor. The means for switching may include means for disabling the enabled channel, enabling the disabled channel when the energy value is increasing, concave upward, and a local extremum has been reached.

DISCLOSURE OF PREFERRED EMBODIMENT

Other objects, features and advantages will occur to those skilled in the art from the following description of a preferred embodiment and the accompanying drawings, in which.

Figure 9:
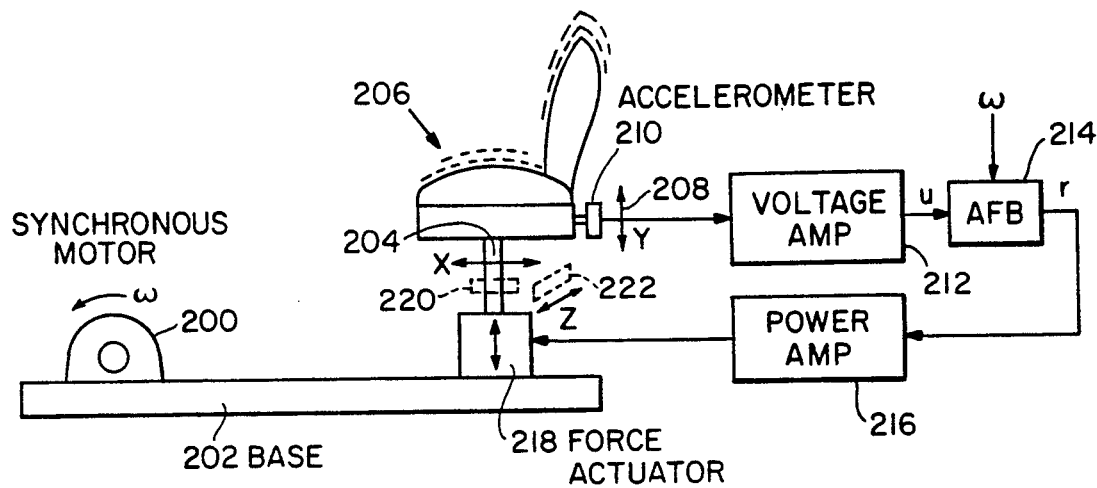
Figure 10:
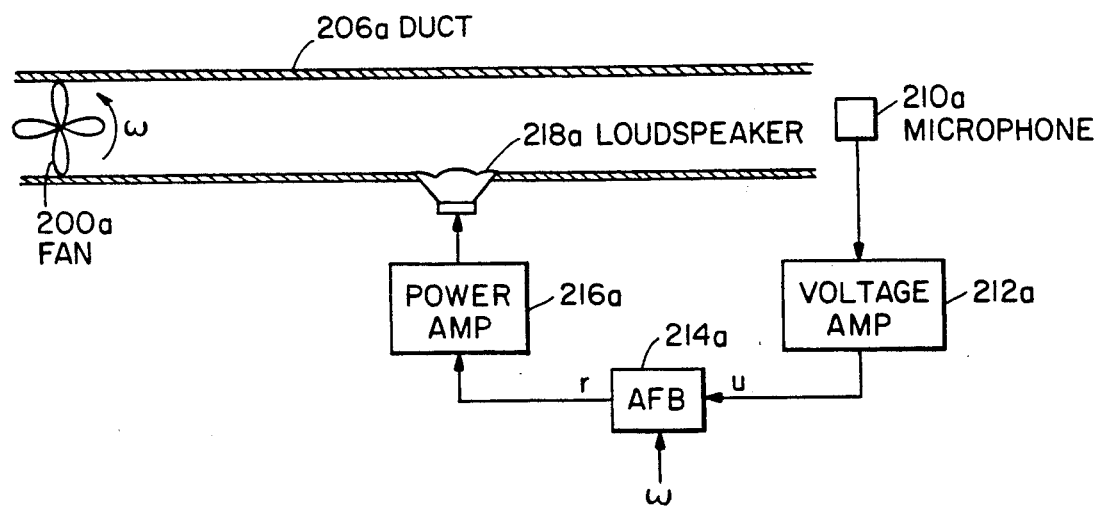

FIG. 9 is a schematic block diagram of an adaptive synchronous vibration suppression apparatus according to this invention employed to cancel vibrations in a seat caused by a proximate synchronous motor; and FIG. 10 is a schematic block diagram of an adaptive synchronous vibration suppression apparatus according to this invention employed to cancel vibrations in a fan duct caused by a proximate fan.

Figure 1:
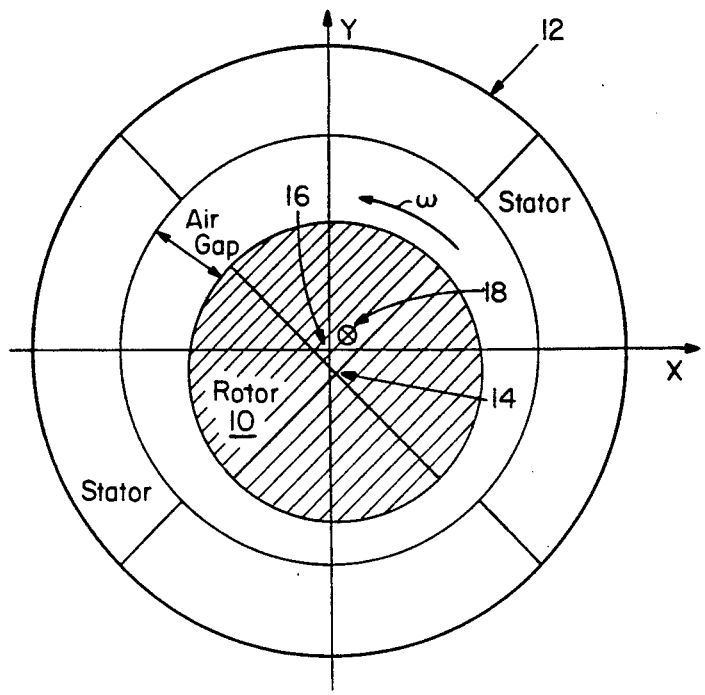
FIG. 1 is a schematic end view of a magnetic rotor bearing illustrating the geometric centers of the rotor and stator and the center of mass of the rotor.

There is shown in FIG. 1 a rotor 10 rotatable relative to stator 12 suspended by means of magnetic bearings relative to stator 12. By the use of the magnetic bearings, rotor 10 can be positioned to rotate anywhere within stator 12; preferably it is centered so that the geometric center 14 of rotor 10 is at the geometric center 16 of stator 12. However, in some cases, even when the two centers 14 and 16 are aligned for rotation there are vibrations due to mass-unbalance in the rotor as a result of manufacturing deficiencies or damage to the rotor during installation or operation.

This invention adjusts the orbit of geometric center 14 so that rotation occurs about the true center of mass 18 of rotor 10.

Figure 2:
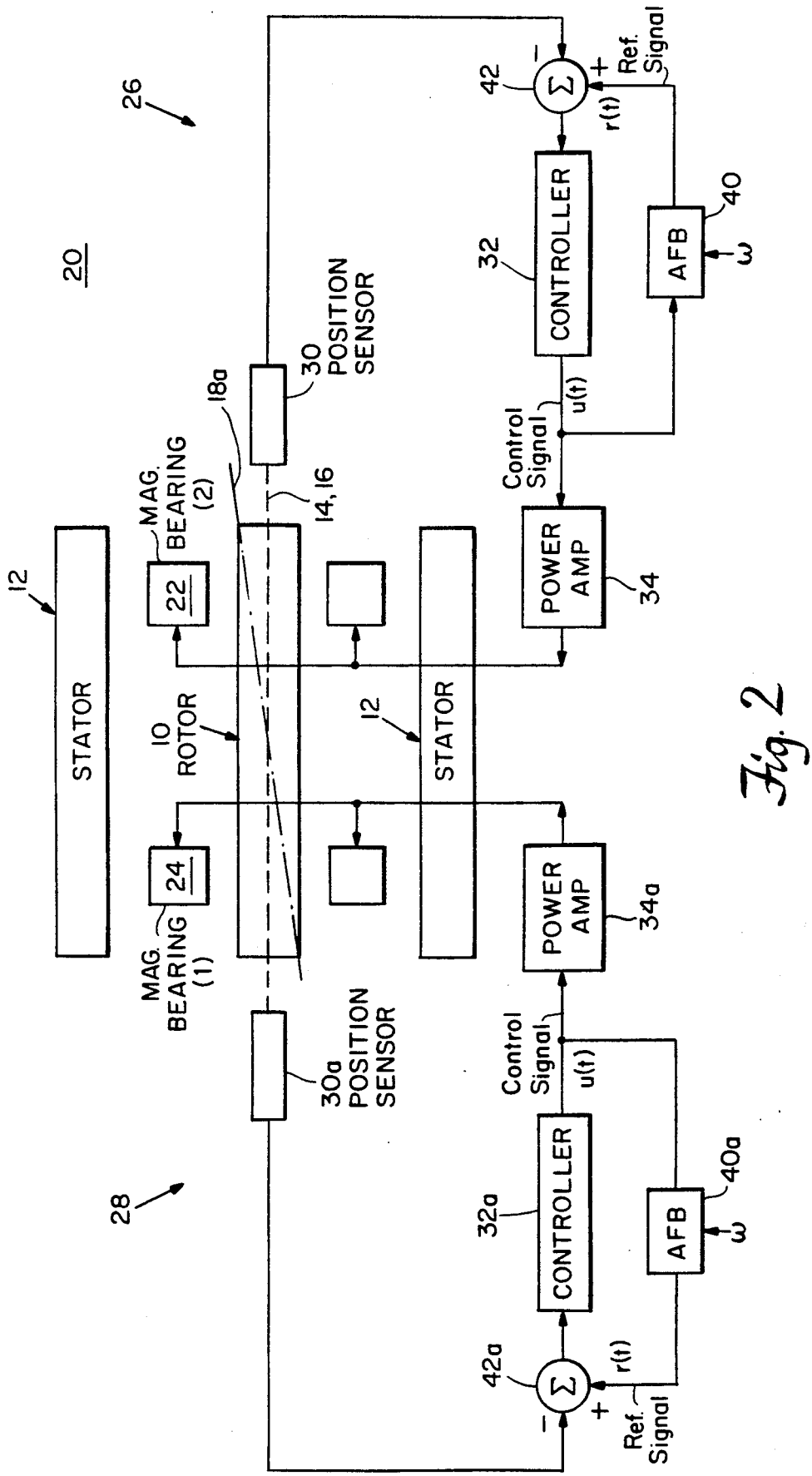
FIG. 2 is a schematic block diagram of a magnetic bearing suspension apparatus including two magnetic bearings with their control systems and including the adaptive forced balancing system according to this invention for controlling the orbit of the geometric centers to compel the rotor to rotate about its axis of inertial mass, thereby eliminating the source of the vibration.

In a conventional machine 20, FIG. 2, there are a pair of magnetic bearings 22 and 24 each having associated with it a magnetic bearing suspension apparatus 26 and 28, respectively. Magnetic bearing suspension apparatus 26 includes a sensor 30 for sensing the position of rotor 10 with respect to stator 12. The output from position sensor 30 drives controller 32 to produce a control signal to amplifier 34 which drives bearing 22. Magnetic bearing suspension apparatus 28 includes similar parts which have been given like numbers accompanied by a lower case a. By connecting the center of mass positions along the entire length of rotor 10, the principal axis of inertia 18a is defined. It is this axis about which rotation is achieved using this invention. To do so, the geometric axis 14 is made to define an orbital path as follows.

In accordance with this invention, an adaptive forced balancing system 40 and 40a is used in conjunction with controllers 32 and 32a, respectively. The output from controller 32, the control signal, is fed back to the adaptive forced balancing system 40 to generate a synchronous position reference signal or position command r(t) which is combined in summer 42 with the signal from position sensor 30 to provide a modified signal to controller 32. The purpose of the synchronous position reference signal r(t) from adaptive forced balancing system 40 is to cancel the synchronous component from the position sensor 30 so that the modified signal to controller 32 and, hence, the control signal u(t) and power amplifier 34 output are void of a synchronous component. In this way magnetic bearing 22 does not apply a synchronous force to rotor 10, thereby effecting rotation about inertial axis 18a. In this manner geometric axis 14 is made to define a synchronous orbital path by synchronous position command r(t). Adaptive forced balancing system 40a operates in the same fashion.

Figure 3:
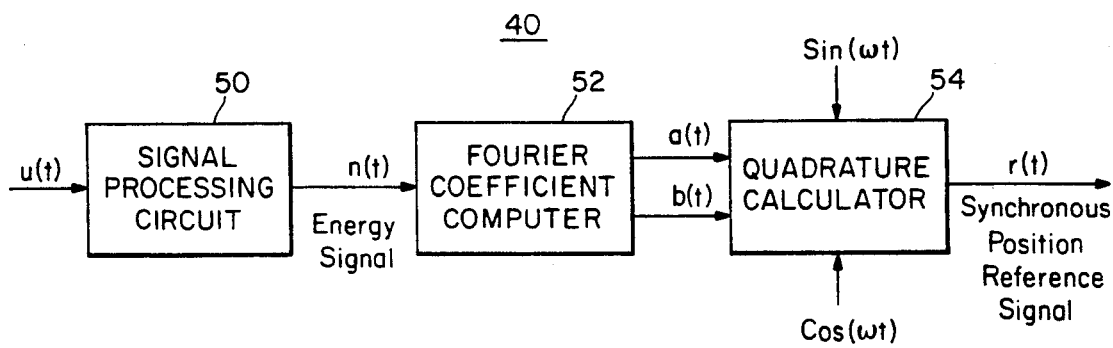
FIG. 3 is a more detailed block diagram of the adaptive forced balancing system of FIG. 2.
Figure 4:
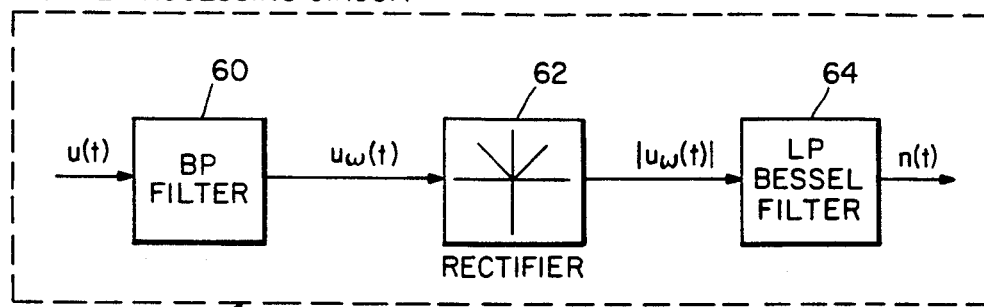
FIG. 4 is a more detailed block diagram of the signal processing circuit of FIG. 3.
Figure 5:
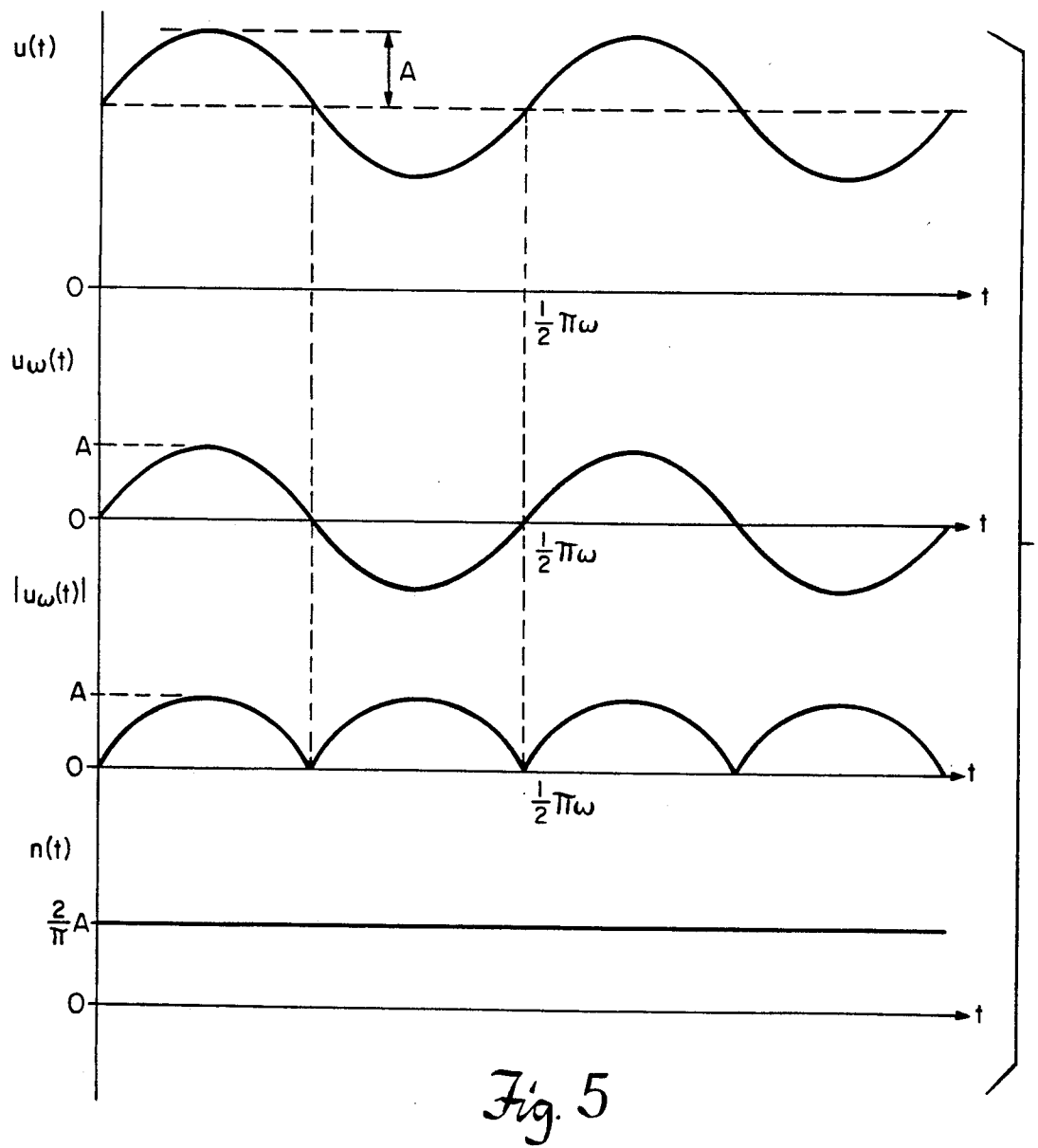
FIG. 5 illustrates a plurality of waveforms which occur in FIGS. 3 and 4.

Adaptive forced balancing system 40 is shown in greater detail in FIG. 3 as including a signal processing circuit 50 that receives the control signal u(t) and provides an output signal n(t), which is the energy representative of the mass-unbalance of rotor 10. The energy signal n(t) is submitted to a Fourier coefficient computer 52 which generates Fourier coefficients a(t) and b(t). The coefficient terms a(t) and b(t) are used to generate the Fourier quadrature terms in calculator 54 and combined to produce the synchronous position command r(t). Signal processing circuit 50 includes a bandpass filter 60, FIG. 4, which receives the control signal u(t) shown in FIG. 5 and produces the synchronous component $u_\omega(t)$ of the control signal, that it delivers in turn to rectifier 62. Rectifier 62 provides the absolute value $|u_\omega(t)|$ of the synchronous component of the control signal, which in turn is delivered to the low-pass Bessel filter that produces the average value of $u_\omega(t)$ as shown in FIG. 5.

Figure 6:
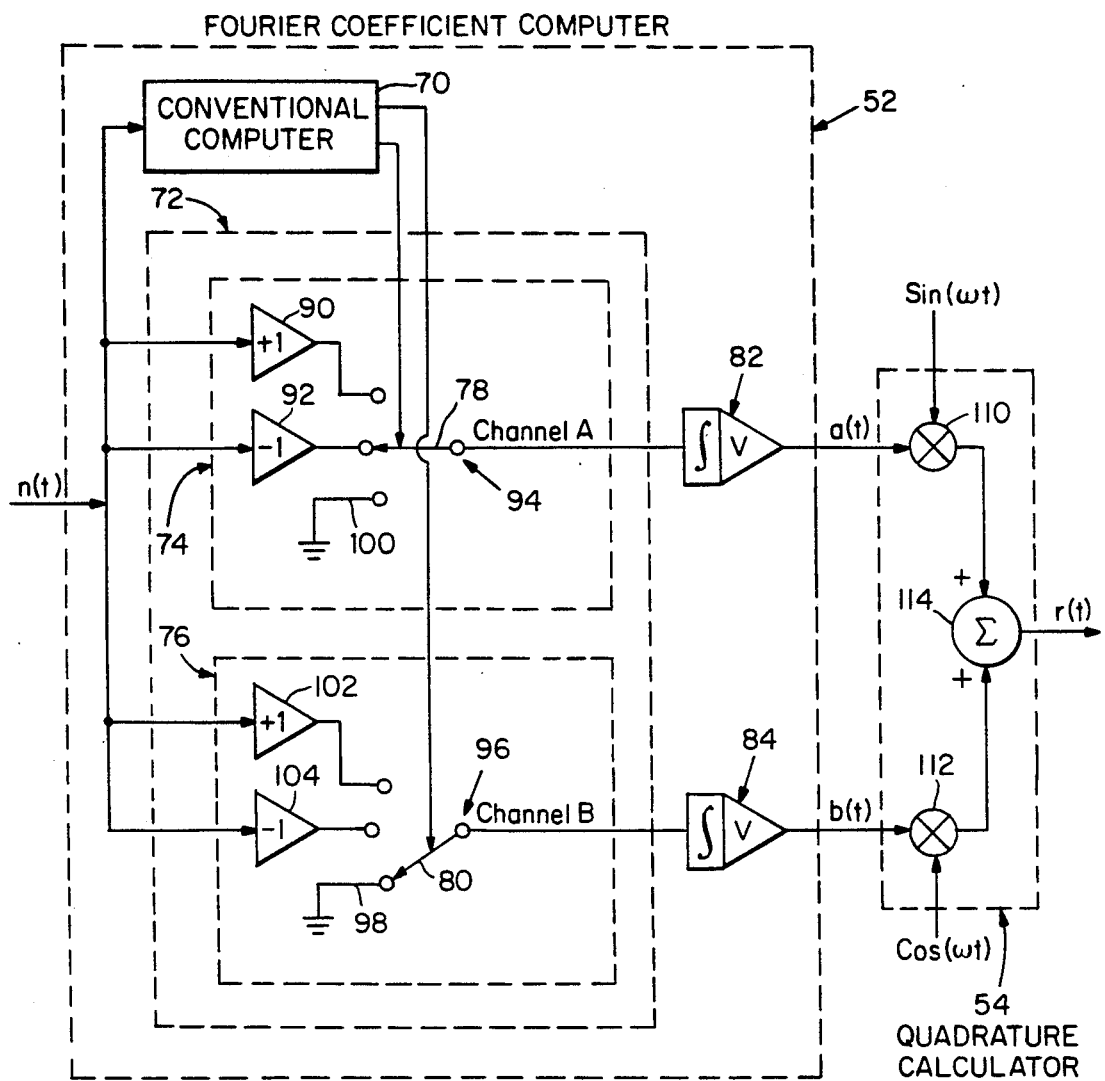
FIG. 6 is a more detailed schematic diagram of the Fourier coefficient computer and the quadrature calculator of FIG. 3.

Fourier coefficient computer 52 and quadrature calculator 54 are shown in greater detail in FIG. 6. Fourier coefficient computer 52 includes a conventional computer 70 such as an IBM PC, which receives the energy signal n(t) and determines whether it is increasing or decreasing, whether it is concave facing upward or downward, and whether a local extremum, that is a local maximum or a local minimum, is occurring with respect to the signal n(t).

Computer 70 drives switching means 72 which has two sections 74 and 76, each of which is in a separate channel A 78 and B 80, respectively. Channel A 78 includes an integrator 82 which integrates the output from switching section 74 to provide the Fourier coefficient a(t). Channel B 80 includes integrator 84 which integrates the output from switch section 76 to create Fourier coefficient b(t). Integrators 82 and 84 may also include a constant gain needed to scale the synchronous position command r(t) with respect to the control signal u(t). Assuming as shown that channel A 78 is enabled and channel 80 is disabled, then switching section 74 is set so that either the +1 amplifier 90 output or the −1 amplifier 92 output is connected to line 94. In that case, line 96 of channel B 80 is connected to the ground or zero terminal 98. As long as the energy signal n(t) is decreasing or is shaped concavely downward, computer 70 keeps the connection to the −1 amplifier 92 intact. However, if the signal n(t) is increasing and is concave upward, computer 70 connects line 94 to the +1 amplifier 90. Further, if the signal n(t) is increasing and shaped concavely upward and there is a local extremum occurring, that is, a maximum or minimum, then computer 70 switches line 94 to the ground terminal 100 of switch section 74 and switches line 96 of channel B 80 away from its ground terminal 98 to either its plus 102 or minus 104 amplifiers and the operation then continues with signal n(t) driving channel B 80 while channel 78 is switched to the ground terminal 100. The outputs a(t) from integrator 82 and b(t) from integrator 84 are submitted to multipliers 110, 112 which multiply the coefficients by $\sin(\omega t)$ and $\cos(\omega t)$ respectively, to obtain the Fourier quadrature terms, which are then combined in summer 114 to obtain the synchronous position reference command r(t).

Figure 7:
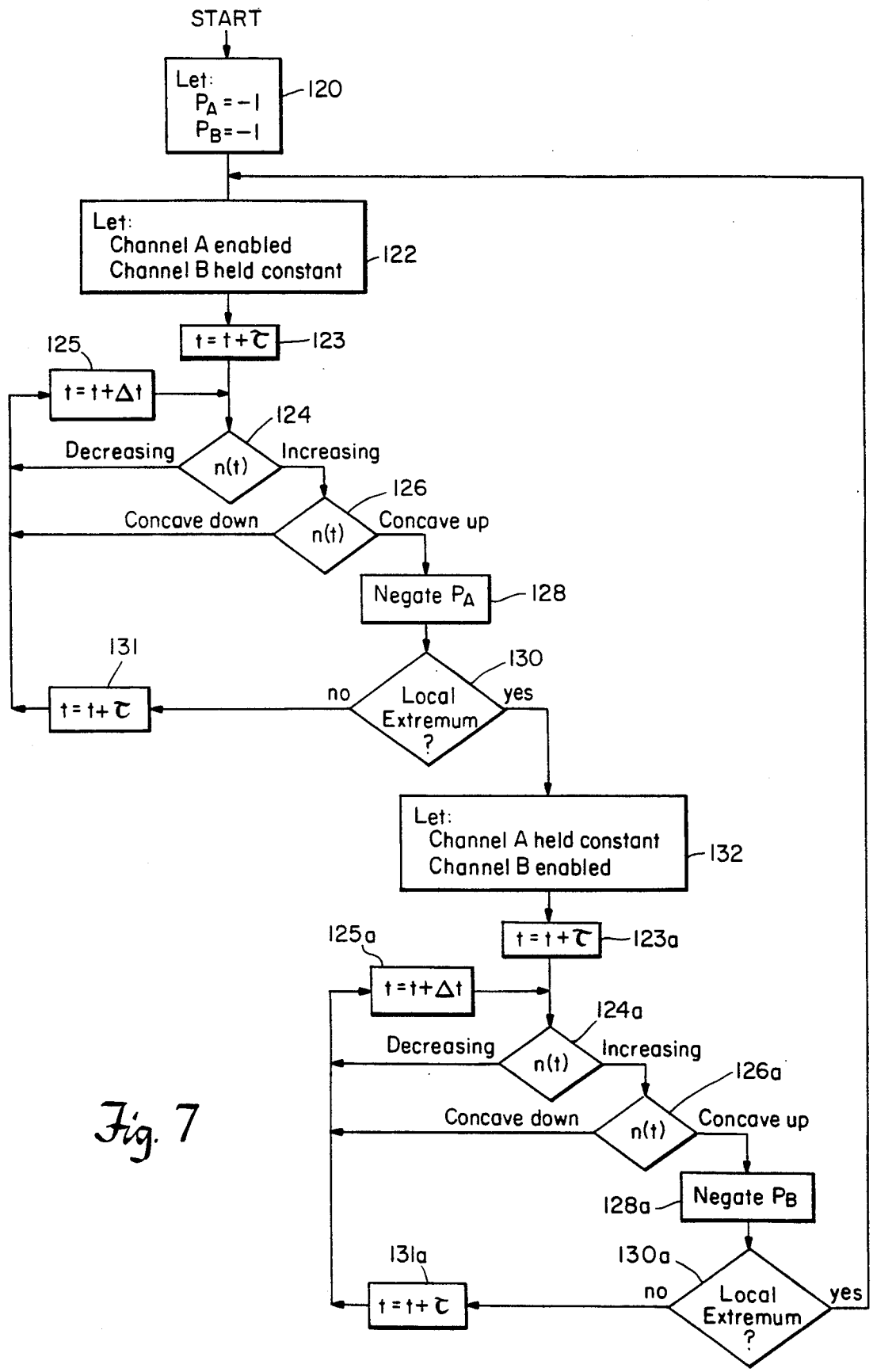
FIG. 7 is a flow chart of the software used to operate the switching sections in FIG. 6.
Figure 8:
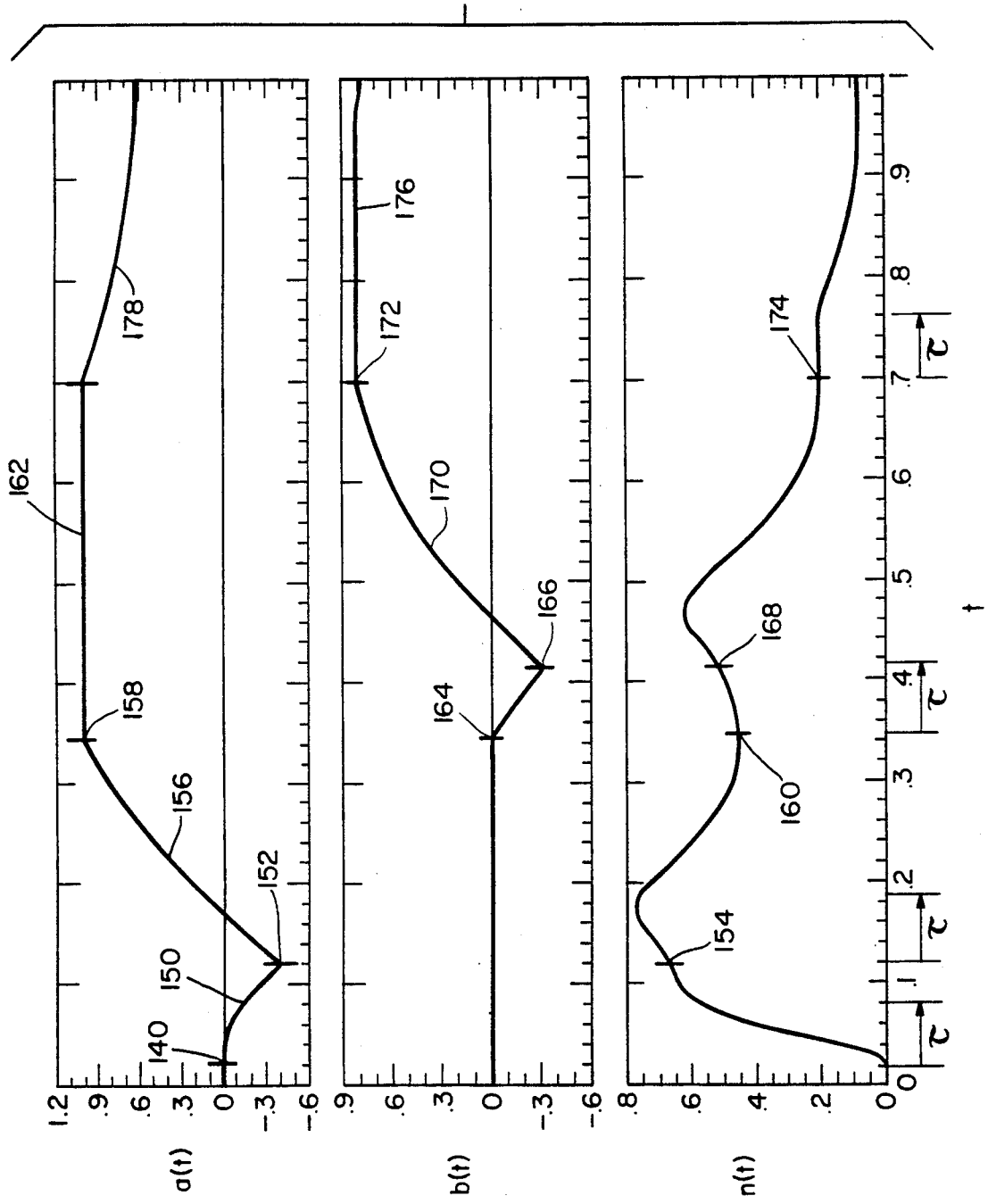
FIG. 8 illustrates the synchronous energy signal n(t) and the Fourier coefficients a(t), b(t) resulting therefrom.

The function of computer 70 and switching circuit 72 is explained further with respect to FIG. 7, where an error polarity variable PA and PB defined, respectively, for each of the channels A 78 and B 80 is initially set to either +1 or −1 in step 120. Following this in step 122, one of the channels is enabled and one is disabled. In this case, channel A is enabled so that channel B is disabled or held constant, as indicated by the position of line 96 connected with the ground terminal 98 in FIG. 6. Channel A is enabled or made operative by connecting line 94 to either the +1 amplifier 90 or the −1 amplifier 92 in accordance with the current value of PA. In this case, PA was initially set to −1 in step 120 so that line 94 is connected to the −1 amplifier 92 of FIG. 6. Following this, computer 70 waits for a time period τ, step 123, which is the response time of signal processing circuit 50 of FIG. 3. Following this, the inquiry is made by computer 70 as to whether the energy signal n(t) is increasing or decreasing. If it is decreasing, step 124, the system simply cycles back through timing step 125 and revisits step 124. If in response to the inquiry in step 124 it is determined that the energy signal n(t) is increasing, then a further inquiry is made in step 126 as to whether the waveform presently has a shape which is concave downwardly or concave upwardly. If it is concave downwardly the system returns through timer 125 to step 124. If it is concave upwardly, then in step 128 the variable PA is negated, that is, it is given the value +1 if it was previously −1, or −1 if it was previously +1. As a result line 94 would be disconnected from the minus amplifier 92 and reconnected to the plus amplifier 90. The implication when the waveform is increasing and facing concave upwardly is that the absolute value of the error in a(t) is increasing as a result of PA having an incorrect value. The action taken therefore is to negate the polarity variable in step 128. If it is further determined in step 130 that there is a local extremum occurring, that is, either a maxima or minima, then a further corrective operation is undertaken in step 132, whereby channel A 78 is put into the constant condition and channel B 80 is enabled or made operative. In that case line 96 would be connected to either the +1 amplifier 102 or the −1 amplifier 104 in accordance with the current value of PB and line 94 would be connected to the ground terminal 100. If the response to the inquiry in step 130 is that no extremum is occurring, the computer 70 waits for a time period $\tau$ in step 131 before revisiting step 125. Now the same subroutine is accomplished with respect to channel B 80 for the calculation of Fourier coefficient b(t) and like steps have been given like numbers accompanied by a lower case a. After step 130a, the system re-enters step 122, where channel A 78 is once again enabled to calculate Fourier coefficient a(t) and channel B 80 is disabled so that the Fourier coefficient b(t) is kept constant. The effect of this can be seen in FIG. 8, where the Fourier coefficient a(t) is enabled at point 140 and begins the downward trend 150. After waiting a time period, step 123, the energy signal n(t) is found to have an increasing and concave upwardly value at point 154 by the inquiry in steps 124 and 126. At this point PA is negated from $-1$ to $+1$ and, correspondingly, a(t) switches direction at point 152 and moves generally upwardly in a positive direction as indicated in area 156. Subsequently, at point 158 coefficient a(t) is held constant. That is the point at which n(t) appears not only as an increasing signal which is concave upward, but also as a local extremum point 160. It is at this point that the computer 70 in step 132 flips switch sections 74 and 76 so that line 94 connects with ground terminal 100 so that the output a(t) becomes constant in the region 162 while at the same time switch section 76 has its line 96 moved to the $-1$ amplifier 104, enabling channel B 80. At this point 164 b(t) begins a downward trend and maintains that until point 166, where signal n(t) after a time period $\tau$ displays an increasing concave up shape at point 168. At that point, signal b(t) begins a positive upward trend as shown at region 170, which it continues up to a point 172, where signal n(t) has once again undergone an increasing concave upward trend along with a local extremum at 174. This causes the computer 70 to once again swap the condition of switch sections 74 and 76 so that channel B 80 is now switched back to ground terminal 98 and b(t) experiences a constant output shown in region 176, while coefficient a(t) begins a decreasing output value in region 178.

Although thus far in FIGS. 1–8 the adaptive synchronous vibration suppression apparatus has been implemented as an adaptive forced balancing system for a rotor and the apparatus acts to eliminate the source of the vibration by reorienting the axis of rotation of the rotor from the geometric axis to the center of mass axis, this is not a necessary limitation of the invention. For example as shown in FIGS. 9 and 10 the apparatus could be used to cancel the vibrations without eliminating their source.

Synchronous motor 200, FIG. 9, because of unbalances causes vibrations which move through base 202 to the post 204 of seat 206. This causes an unwanted vibration of seat 206 in the "Y" direction, arrow 208. Accelerometer 210 senses the "Y" direction acceleration and provides a signal to voltage amplifier 212 whose output signal is delivered to adaptive forced balance system (AFB) 214. AFB 214 uses the speed $\omega$ of motor 200 and the signal u to generate the synchronous reference signal r or command which is amplified in power amplifier 216 to drive actuator 218 that operates to cancel the "Y" axis vibration. If vibrations in the X and Z dimensions are to be cancelled additional sensors 220, 222, respectively, may be used with additional AFB loops.

Similarly, fan 200a, FIG. 10, causes vibrations which through its mountings (not shown) are communicated to duct 206a. This causes an unwanted vibration which is sensed by microphone 210a whose output is processed by voltage amplifier 212a, AFB 214a, and power amplifier 216a to produce a command to drive loudspeaker 218a whose output acts to offset the unwanted vibrations.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An adaptive forced balancing system for a rotor magnetic bearing suspension apparatus having a magnetic bearing control signal, comprising:
   means, responsive to the magnetic bearing control signal, for detecting the energy representative of the mass-unbalance of the rotor;
   means, responsive to said means for detecting, for computing two Fourier coefficients of the energy representative of the mass-unbalance of the rotor; and
   means responsive to said means for computing said two Fourier coefficients, for generating a position command to the rotor magnetic bearing suspension apparatus to define the orbit of the geometric center of the rotor to effect rotation of the rotor about its center of mass.

2. The adaptive forced balancing system of claim 1 in which said means for detecting includes means for extracting the synchronous component of the magnetic bearing control signal; means, responsive to said synchronous component, for producing the absolute value of said synchronous component; and means, responsive to said absolute value of said synchronous component, for defining the average of said absolute value of said synchronous component.

3. The adaptive forced balancing system of claim 1 in which said means for generating a position command includes means responsive to said two Fourier coefficients, for calculating the quadrature components of the position command; and means, responsive to said means for calculating, for summing the quadrature components to obtain the position command.

4. The adaptive forced balancing system of claim 3 in which said means for computing includes a channel for developing each of said Fourier coefficients, and switching means for selectively enabling one of said channels and disabling the other as a function of the value of the energy representative of the mass-unbalance of the rotor.

5. The adaptive forced balancing system of claim 4 in which said means for switching includes means for disabling the enabled channel and enabling the disabled channel when said energy value is increasing, concave upward, and a local extremum has been reached.

6. An adaptive forced balancing system for a rotor suspension apparatus having a suspension control signal, comprising:
   means, responsive to the suspension control signal, for detecting the energy representative of the mass-unbalance of the rotor;
   means, responsive to said means for detecting, for computing two Fourier coefficients of the energy representative of the mass-unbalance of the rotor; and means, responsive to said means for computing said two Fourier coefficients, for generating a position command to the rotor suspension apparatus to define the orbit of the geometric center of the rotor to effect rotation of the rotor about its center of mass.

7. The adaptive forced balancing system of claim 6 in which said means for detecting includes means for extracting the synchronous component of the suspension control signal; means, responsive to said synchronous component, for producing the absolute value of said synchronous component; and means, responsive to said absolute value of said synchronous component, for defining the average of said absolute value of said synchronous component.

8. The adaptive forced balancing system of claim 6 in which said means for generating a position command includes means responsive to said two Fourier coefficients, for calculating the quadrature components of the position command; and means, responsive to said means for calculating, for summing the quadrature components to obtain the position command.

9. The adaptive forced balancing system of claim 8 in which said means for computing includes a channel for developing each of said Fourier coefficients, and switching means for selectively enabling one of said channels and disabling the other as a function of the value of the energy representative of the mass-unbalance of the rotor.

10. The adaptive forced balancing system of claim 9 in which said means for switching includes means for disabling the enabled channel and enabling the disabled channel when said energy value is increasing, concave upward, and a local extremum has been reached.

11. An adaptive synchronous vibration suppression apparatus for suppressing vibrations in a dynamic system subject to synchronous disturbance, comprising:

means for detecting the energy representative of the synchronous component of the vibration induced by a synchronous disturbance including means for extracting the synchronous component of the vibration, means, responsive to said synchronous component, for producing the absolute value of said synchronous component, and means, responsive to said absolute value of said synchronous component, for defining the average of said absolute value of said synchronous component;

means, responsive to said means for detecting, for generating a Fourier coefficients, amplitude and phase command based on said average of said absolute value of said synchronous component; and actuator means, responsive to said command, for applying a force to the system to suppress the detected said vibration.

12. The adaptive synchronous vibration suppression apparatus of claim 11 in which said means for generating includes means for computing from the energy representative of the synchronous component of the vibration two Fourier coefficients of the command; means, responsive to said Fourier coefficients, for calculating the quadrature components of the command; and means, responsive to said means for calculating, for summing the quadrature components to obtain the command.

13. The adaptive synchronous vibration suppression apparatus of claim 12 in which said means for computing includes a channel for developing each of said Fourier coefficients, and switching means for selectively enabling one of said channels and disabling the other as a function of the value of the energy representative of the synchronous component of the vibration.

14. The adaptive synchronous vibration suppression apparatus of claim 13 in which said means for switching includes means for disabling the enabled channel and enabling the disabled channel when said energy value is increasing, concave upward, and a local extremum has been reached.

15. An adaptive forced balancing system for a rotor magnetic bearing suspension apparatus having a magnetic bearing control signal, comprising:

means, responsive to the magnetic bearing control signal, for detecting the energy representative of the mass-unbalance of the rotor; and means, responsive to said means for detecting, for generating a position command to the rotor magnetic bearing suspension apparatus to define the orbit of the geometric center of the rotor to effect rotation of the rotor about its center of mass, including means for computing, from the energy representative of the mass-unbalance of the rotor, the Fourier coefficients of the position command, means, responsive to said Fourier coefficients, for calculating the quadrature components of the position command, and means, responsive to said Fourier coefficients, for calculating the quadrature components of the position command, and means, responsive to said means for calculating, for summing the quadrature components to obtain the position command.

16. An adaptive forced balancing system for a rotor suspension apparatus having a suspension control signal, comprising:

means, responsive to the suspension control signal, for detecting the energy representative of the mass-unbalance of the rotor; and means, response to said means for detecting, for generating a position command to the rotor suspension apparatus to define the orbit of the geometric center of the rotor to effect rotation of the rotor about its center of mass, including means for computing, from the energy representative of the mass-unbalance of the rotor, the Fourier coefficients of the position command, means responsive to said Fourier coefficients, for calculating the quadrature components of the position commands, and means, responsive to said means for calculating, for summing the quadrature components to obtain the position command.

* * * * *